Feb. 28, 1939.  A. BARNA  2,148,797

AUTOMATIC UNDER-WATER TORCH LIGHTER

Filed June 28, 1937

Inventor
Andrew Barna

Patented Feb. 28, 1939

2,148,797

UNITED STATES PATENT OFFICE 2,148,797

AUTOMATIC UNDER-WATER TORCH LIGHTER

Andrew Barna, Chicago, Ill.

Application June 28, 1937, Serial No. 150,772

1 Claim. (Cl. 158—27.4)

This invention relates to a novel and improved under water torch lighter which permits the torch to relight automatically under water.

The main object of the invention is to remove the chances of having the torch extinguished under the water and force the driver to come to the surface for reigniting same.

Another object of the invention is to enable the owner of any standard cutting torch to change same quickly for the use of cutting under water.

Another object of the invention is to provide a torch lighter which is simple in construction and replaced with minimum cost.

With the foregoing and other objects in view, which will appear as the description proceeds, the invention consists in certain novel features of construction and arrangements of parts hereinafter more fully described, illustrated in the accompanying drawing, and particularly pointed out in the appended claims, it being understood that various changes in the form, proportion, size and minor details of the structure may be made without departing from the spirit or sacrificing any of the advantages of the invention. I have illustrated in the accompanying drawing a preferred embodiment of the invention, from an inspection of which, when considered in connection with the following description, the invention, its mode of construction and assembly, and many of its advantages, shall be readily understood and appreciated.

Referring to the drawing in which similar characters of reference are employed to indicate corresponding parts throughout the several figures of the drawing.

Figure 1:
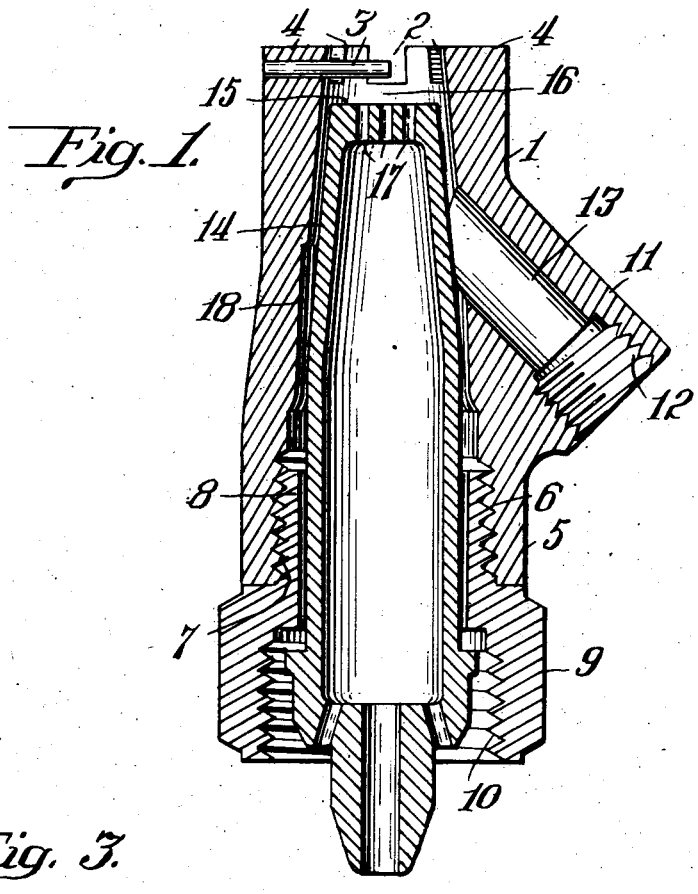
Figure 1 is a longitudinal sectional view on line 1—1 of Figure 2.
Figure 3:
Figure 3 is a view of the igniting element.
Figure 2:
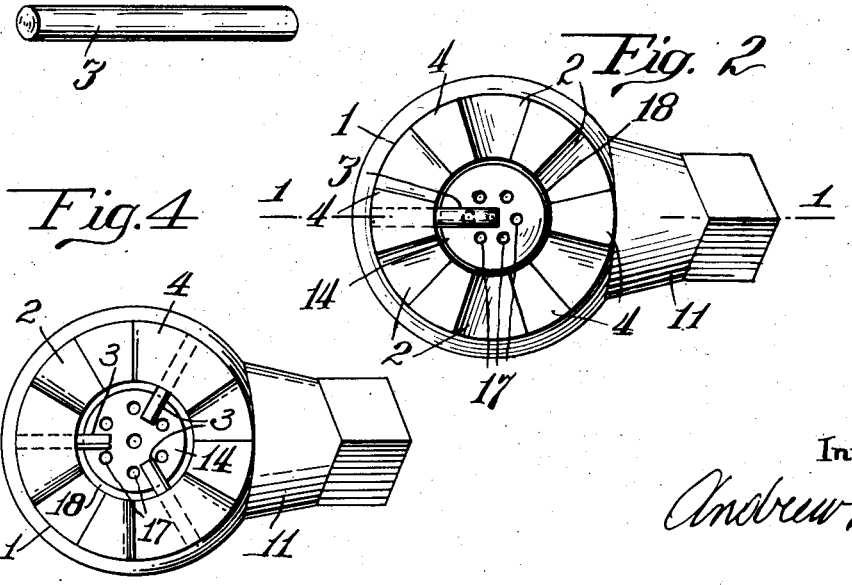
Figure 2 is a top view of the instrument.
Figure 4:
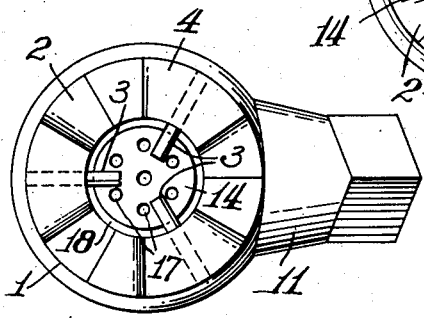
Figure 4 is a top view, showing the arrangement of the multiple igniting elements.

The said torch lighter consists essentially of a shield 1, which has at its upper end the recesses 2, to permit the gases, generated during the cutting process to escape. The igniting element 3, is secured to any one or all of the projections 4. The lower end of the shield 1, has an enlarged part 5, with an internal thread 6, to receive the exterior threads 7, of the projection 8, of the adapter 9, has an internal threaded part 10, to permit to join it to the torch body. 11, is an integral branch with the shield 1, for the air supply, housing a passage 13, and an internal threaded part 12, to permit joining it to the air line.

In applying the automatic under water torch lighter to the standard torches, first the nut holding the torch tip 14, to the torch body is removed and the adapter 9, is screwed on in its place. To the projection 8, of the adapter 9, the shield 1, is secured permanently.

Between the top 15, of the torch tip 1, and the igniting element 3, there is an air gap 16, to enable the element 3, to become white hot, by means of the gas mixtures which are passing through the holes 17, of the cutting torch tip 14. Between the tip 14, and the shield 1, there is an air space 18, to protect the torch tip 14, from being chilled by the water.

In applying the automatic under water torch lighter to do under water work, after the gas and air supply is opened up under pressure, the mixture issued at the top of the tip is ignited on the free air. When the igniting element becomes white hot then the torch can be immersed under water to do the work without interruption. If for any reason, the torch should become extinguished, it quickly reignites by means of the white hot condition of the igniting element.

What I claim as new and desire to secure by Letters Patent is:

A device for use in combination with an oxy-acetylene torch, comprising a shield adapted to surround the head of said torch and to extend beyond the tip thereof to form an open-ended chamber; means for supplying air to said shield to envelop the flame from said torch tip; one or more igniting elements secured in the forward portion of said shield and projecting into the flame within said chamber whereby said elements are kept at white heat during operation to insure the ignition of the escaping gases.

ANDREW BARNA.